June 9, 1925.  
E. SMITH  
1,541,533  
STONE AND ROCK PICKING MECHANISM  
Filed Sept. 9, 1921  
3 Sheets-Sheet 3

Edward Smith  
Inventor  
By Lancaster and Allwine  
Attorneys

Patented June 9, 1925.

1,541,533

UNITED STATES PATENT OFFICE.

EDWARD SMITH, OF WEYERHAUSER, WISCONSIN.

STONE AND ROCK PICKING MECHANISM.

Application filed September 9, 1921. Serial No. 499,515.

*To all whom it may concern:*

Be it known that I, EDWARD SMITH, a citizen of the United States, residing at Weyerhauser, in the county of Rusk and State of Wisconsin, have invented certain new and useful Improvements in Stone and Rock Picking Mechanism, of which the following is a specification.

This invention relates to machines for picking up stones and the like from fields, and the primary object of the invention is to provide a novel machine of simple and durable character, which will effectively and quickly clear a field of stones with a minimum amount of labor and entirely eliminate the difficulties heretobefore experienced in clearing a field of stones manually.

Further objects of the invention are first, to provide a frame for supporting the working parts of the machine; second, to provide a novel stone gatherer tooth arrangement for engaging stones and rocks as the machine is driven across the field; third, to provide a novel means for adjusting the teeth in relation to the ground; and fourth, to provide a novel picking mechanism rotatably carried by the frame arranged to cooperate with the gathering teeth for receiving the stone and for carrying the stone to a suitable wagon or barge.

With these and other objects in view, the invention consists in the novel construction, arrangement and formation of parts, as will be hereinafter more specifically described, claimed and illustrated in the accompanying drawings, forming a part of this specification, in which drawings:

Figure 4 is a detail perspective view illustrating the means employed for permitting the stone guide to be adjusted in relation to the dump wagon and the stone picking mechanism.

Figure 1:
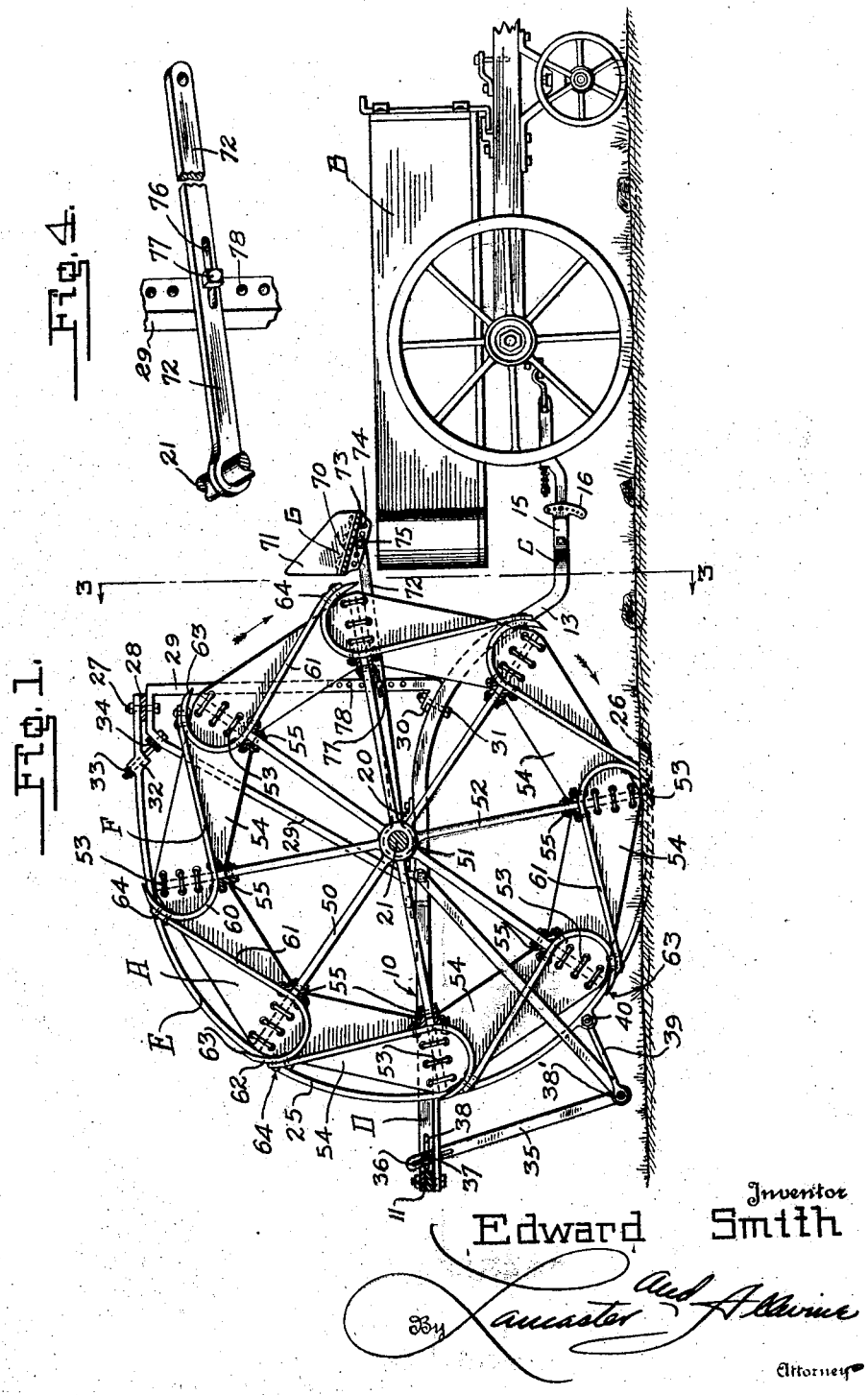
Figure 1 is a central longitudinal section through the improved stone picking machine taken on the line 1—1 of Figure 2, showing the same operatively connected to an improved type of dumping wagon, said dumping wagon being shown in elevation.

Referring to the drawings in detail, wherein similar reference characters designate corresponding parts throughout the several views, the letter A indicates the improved stone and rock picking machine; B, the dump wagon associated therewith; and C, the means for connecting the rock and stone picking machine with the dump wagon.

The improved stone and rock picking mechanism A includes a frame D, a novel gatherer E, the novel picking teeth and cooperating parts F; and G the guiding mechanism for facilitating the loading of the stone into the dump wagon B from the stone picking teeth F.

The frame D is of an open rectangular construction and includes the longitudinally extending side bars 10, the rear connecting end bar 11, and the forwardly extending arms 12 and 13. These arms 12 and 13 are curved downwardly and then forwardly, as at 15 and terminate in sector shaped heads or clevises 16 for a purpose which will hereinafter more fully appear. The end bar 11 can be connected with the longitudinally extending side bars 10 by a suitable diagonally extending brace bar 19 if so desired, and in fact the frame D can be braced in any preferred manner so as to present a strong and rigid construction. The upper surface of the longitudinally extending side bars 10 has secured thereto in any preferred manner, bearings 20 for a transversely extending shaft or axle 21, upon which is mounted for movement therewith the stone picking structure F, which will be hereinafter more fully described.

The stone gathering means E include a plurality of equi-distantly spaced substantially semi-circular tines 25. These tines 25 are provided with forward sharp points 26, which are adapted to engage the rock and stone and force the same upon the tines. These tines extend rearwardly but the lower ends of the same terminate forwardly of the axle or shaft 21, as do their upper forward ends. Their upper forward ends are secured by means of bolts 27 to a transversely extending strip 28, which is supported by the upstanding brackets 29. These brackets 29 have their terminals provided with feet 30 which are bolted as at 31 to the upper surface of the side bars 10. Each of the tines 25 rearwardly of the strip 28 is provided with an eye 32, which receives the adjusting bolt 33. These adjusting bolts 33 also extend through a transversely extending strip 34 which is secured by means of certain of the bolts 33 to the brackets 29. It can be seen that by adjusting the bolts 33, the position of the tines 25 can be regulated in relation to the ground and in relation to each other. In order to form a brace for the rear ends of the tines at the lower ends thereof, depending brace bars 35 are provided. These brace bars 35 have their upper terminals provided with slots 36, which are adapted to receive adjusting bolts 37, which are also extended through slots 38 formed in the side bars 10 adjacent to their rear ends. These adjusting bolts 37 extending through the slots 36 and 38 form means for adjusting the bars 35 in relation to the ground and in relation to the stone picking means F, which as stated, will be hereinafter more fully described. The lower ends of the supporting bars 35 carry a transversely extending rod 38′ which in turn has pivotally connected thereto a plurality of forwardly extending arms 39, which are connected by means of pivot bolts 40 to the tines 25. Thus it can be seen that by adjusting the bars 35, the lower ends of the tines 25 can be adjusted.

Figure 2:
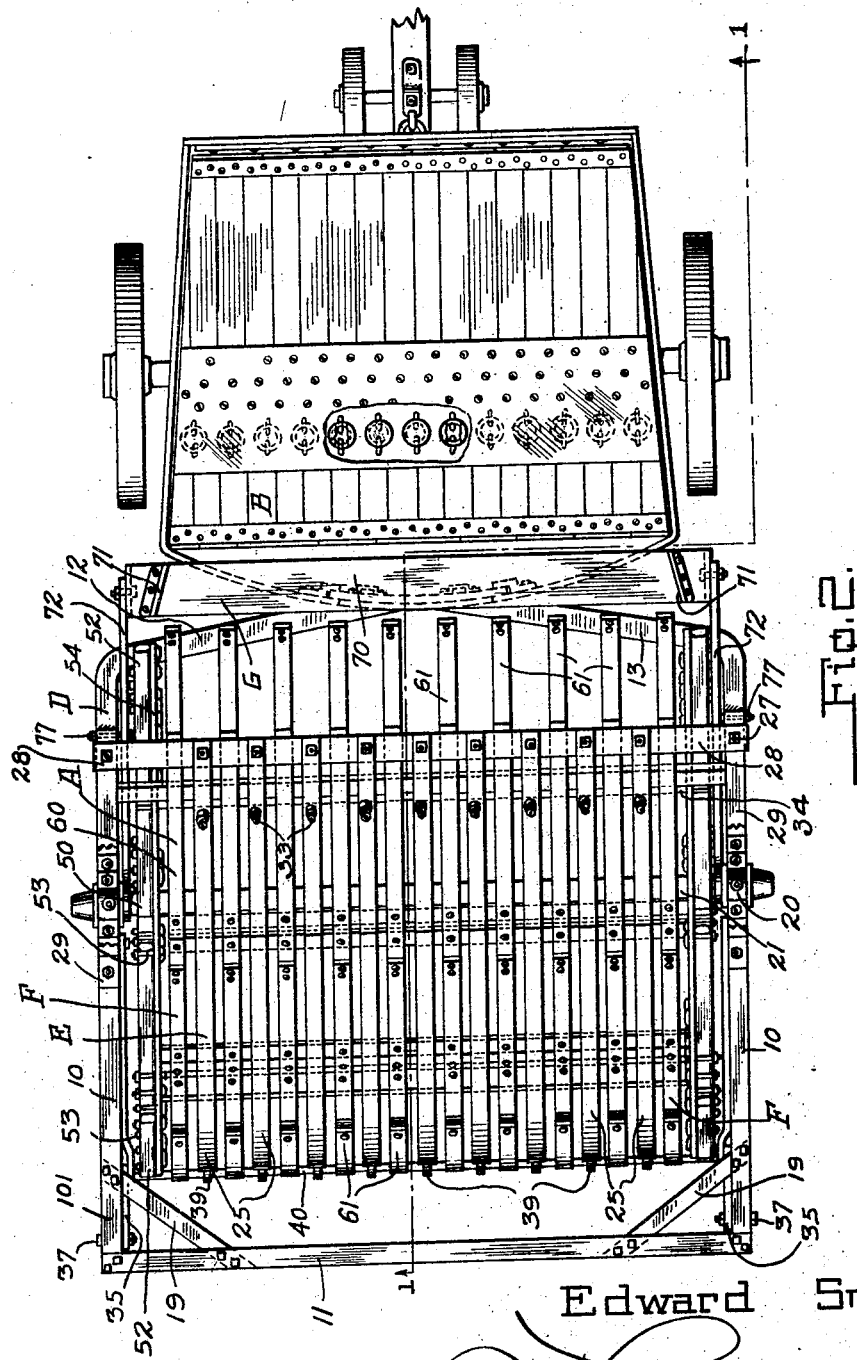
Figure 2 is a plan view of the improved stone picking mechanism including the dumping wagon, parts of the picking mechanism being shown in section.
Figure 3:
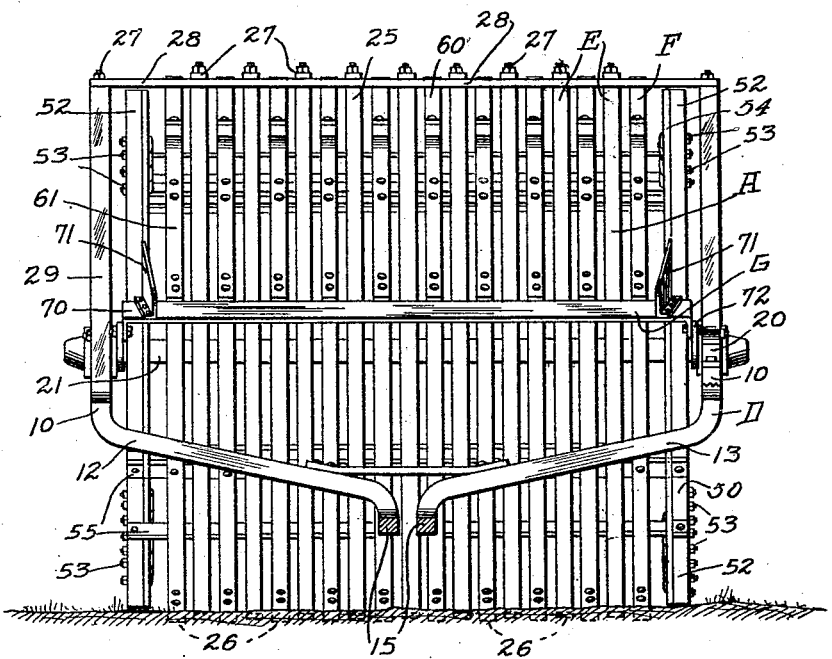
Figure 3 is a section through the improved machine, taken on the line 3—3 of Figure 1, the major portion of the mechanism being shown in front elevation.

The stone picking means F include side wheels or spiders 50, which are arranged relatively close to the side bars 10. These wheels or spiders 50 are arranged in spaced relation to each other and each includes a hub 51 and the radially extending spokes 52. The spokes 52 have secured to their inner faces by suitable U-clips or bolts 53 open frames 54, which constitute side pieces for preventing stones slipping off of the mechanism proper. The spokes 52 have secured thereto inwardly of the side frame 54 transversely extending angle irons 55, which serve the dual function of connecting the wheels or spiders 50 together and bracing the frames 54 and for supporting the picking teeth 60 which will now be described. The picking teeth 60 are substantially the same width as the tines 25 and extend intermediate the tines as clearly shown in Figures 2 and 3 of the drawings. The teeth 60 are substantially hook shaped and include the flat shanks 61 and the arcuate curved ends 62, the terminals of which are sharpened as at 63. These curved ends 62 form pockets for picking and conveying the rocks or stones picked up by the device. As shown the teeth are connected adjacent to the hooked ends 62 thereof to the transversely extending angle iron 55, and the terminals of the shank portions 61 of the teeth are riveted or otherwise secured as at 64 to the adjacent hook portions 62 of the teeth. As shown, the teeth 60 are arranged in annular spaced formation and a series of rows of these teeth are provided.

It can be seen that when the device A is attached to the dumping wagon B and the same is drawn across a field, the rake bars or tines 25 will catch stone or rock and as the wheels or spiders 50 are rotated, the teeth will engage the stone and carry the same upwardly and then throw the same into the dump wagon B. The engagement of the teeth 25 and the wheels or spiders 50 with the ground causes the stone picking means F to rotate when the machine is driven across the ground and it can be seen that the teeth will be in engagement with the ground just when certain of the stones being elevated are to be thrown into the wagon B and thus an impulse will be given the stones so as to insure the falling of the same into the wagon.

While the machine is primarily intended to be self operated, that is the stone picking mechanism to operate itself as the machine is driven across the field, it is to be understood, of course, that a suitable motor can be carried by the machine and operatively connected to the stone picking means to cause forcible rotation thereof.

The guiding means G for the stone consist of a transversely extending inclined guide board 70, the terminals of which may be provided with upstanding guide flanges 71. This guide member G is held in place by a pair of forwardly extending arms 72, which are mounted upon the axle shaft 21 for swinging movement. The forward ends of the arms 72 are adapted to be bolted to the guiding means G, and as shown the guiding means G are provided with depending cleats 73, which are provided with a plurality of adjustment holes 74, into any one of which are adapted to extend the pivot bolts 75 carried by the forward end of the arms 72. The arms 72 are slotted intermediate their ends as at 76 and this slotted portion is adapted to receive an adjusting bolt 77, which can be placed in any one of a plurality of openings 78 formed in the supporting brackets 29. The means of supporting the frame guiding means G permit the same to be readily adjusted in relation to the stone picking means and the dumping wagon, and it can be seen that the guiding means G can be readily raised or lowered by swinging the arms 72 on the axle 21 and by placing the bolts 77 in different holes 78. The guiding means G can be moved forwardly or rearwardly in relation to the picking teeth and to the dumping wagon B by removing the bolts 75 and placing the same in other of the holes 74.

The dumping wagon B can be of any desired construction and will be connected with the stone gathering mechanism by a connecting means which is indicated in general by the letter C and may be of any desired construction. This connecting means will have one end attached to the heads 16 of the frame arms 12 and 13 and its other end connected with the wagon so that the stone gathering mechanism will be drawn across a field behind the wagon.

When in use, the stone gathering mechanism will be connected with the wagon by the connecting means C and will be positioned to the rear thereof.

The tines 25 are adjusted in relation to the ground by the means heretobefore described and the rock guiding means G moved to the desired position. The device is then ready for use, and is drawn across the field by the draft mechanism. The engagement of the teeth 60 with the ground will rotate the wheels or spiders 50, and thus cause the stone and rock to be forced upon the tines 25 and the teeth will catch the stones and carry the same upwardly. The tines will effectively guide the stones in their upward movement and prevent the same from being moved out of engagement with the teeth. When the teeth 60 reach an inverted position the stones will drop onto the guide G from whence they will drop into the wagon bed 82.

When a wagon load of stone has been gathered it is merely necessary to release the wagon from the connecting means C and the wagon can be driven off of the field and dumped at the desired place in the usual way.

From the foregoing description, it can be seen that an exceptionally simple and durable rock and stone gathering machine has been provided, which will effectively and quickly gather the same and thus clear a field in a minimum amount of time and at a minimum cost.

Changes in details may be made without departing from the spirit or scope of this invention.

I claim:

1. A machine for gathering stone comprising a frame, a plurality of arcuate tines carried by the frame and arranged to engage the ground, a rotatable wheel carried by the frame, and a plurality of hook shaped teeth carried by the wheel arranged to engage the ground to cause the wheel structure to rotate when the machine is pulled across the field, each of said teeth having a ground engaging bill and a shank, the shank being secured to the free end portion of the bill of an adjacent tooth and serving to brace the bill.

2. A machine for gathering rocks and stones comprising a frame, a plurality of arcuate tines carried by the frame, a wheeled structure rotatably carried by the frame, a plurality of hook shaped teeth carried by the structure arranged in spaced annular formation, an arcuate bill portion for engaging the ground and a shank portion secured to the outer face of the bill portion of an adjacent tooth near the free end thereof and serving to brace the bill, the spaced annular rows of teeth being disposed between the arcuate tines.

3. A stone gathering machine comprising a wheeled frame, a wheeled structure rotatably carried by the frame including an axle, spiders secured to the axle adjacent to the terminals thereof including radially extending spokes, open side frames secured to the spokes, hook shaped teeth secured intermediate their length to the spokes and arranged in annular spaced formation between said open frames, and each having a ground engaging bill and a shank, the shank being secured to the free end portion of the bill of an adjacent tooth and serving to brace the bill, and a plurality of spaced arcuate tines carried by the frame and arranged intermediate the spaced annular rows of teeth.

4. A stone gathering machine comprising an open frame, bearings carried by the frame, a wheeled structure including an axle rotatably mounted in said bearings, spiders secured to the axle for movement therewith adjacent to the opposite ends of the axle, the spiders including a plurality of spokes, transversely extending strips connecting the spokes together, arcuate teeth arranged in spaced annular rows secured to the strips and to each other, annular open frames secured to the outer surface of the spokes and engaging the end rows of arcuate teeth, upstanding supporting brackets secured to the upper surface of the frame on each side of the wheeled structure, a transversely extending strip secured to the brackets, rearwardly extending arcuately curved tines disposed between the rows of teeth arranged to engage the ground, a clevis carried by the forward end of the frame, and an adjustable supporting structure carried by the frame and arranged to engage the tines adjacent to the lower ends thereof.

5. A stone gatherer comprising a frame, bearings carried by the frame, a wheeled structure arranged in the frame including an axle rotatably carried by said bearings, a plurality of spaced annular rows of hook shaped teeth carried by the wheeled structure, upstanding brackets carried by the frame, a transversely extending strip secured to the upper ends of the brackets, a plurality of rearwardly and arcuately extending tines bolted to said strip, each of the tines having eyes formed therein adjacent to said strip, a second strip secured to said brackets, and a plurality of adjusting bolts carried by the second strip and extended through said eyes.

6. In a stone gathering machine a frame, including side bars, an end bar, a clevis carried by the forward ends of the frame, a wheeled structure rotatably carried by the frame including a plurality of spaced rows of wedge shaped teeth arranged in annular formation, a pair of upstanding brackets secured to the frame forwardly of the axis of the wheeled structure, a plurality of spaced rearwardly and downwardly extending arcuate tines carried by the brackets, a pair of spaced bars carried by the rear ends of the frame, means for adjusting said bars, a rod connecting the bars together, a plurality of arms pivotally secured to the rod and arranged to extend forwardly thereof, and means pivotally securing the last mentioned arms to the arcuate tines adjacent to their lower ends.

EDWARD SMITH.